US009762525B2

(12) United States Patent
Chakra et al.

(10) Patent No.: US 9,762,525 B2
(45) Date of Patent: Sep. 12, 2017

(54) ELECTRONIC MAIL MESSAGING SYSTEM AND METHOD

(75) Inventors: Al Chakra, Research Triangle Park, NC (US); Li Chen, Durham, NC (US); Daniel P. Julin, New York, NY (US); Henri Fouotsop Meli, Durham, NC (US); Govindaraj Sampathkumar, Research Triangle Park, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 974 days.

(21) Appl. No.: 12/970,411

(22) Filed: Dec. 16, 2010

(65) Prior Publication Data

US 2012/0158860 A1    Jun. 21, 2012

(51) Int. Cl.
*G06F 15/16* (2006.01)
*H04L 12/58* (2006.01)

(52) U.S. Cl.
CPC .............. *H04L 51/28* (2013.01); *H04L 51/02* (2013.01); *H04L 51/12* (2013.01)

(58) Field of Classification Search
CPC .. G06Q 10/107; G06Q 10/06; H04L 12/5855; H04L 51/14; H04L 12/585
USPC ....... 709/245, 223, 206, 246, 226, 207, 217, 709/219, 22, 202, 203, 204, 224, 225; 340/7.58, 7.28, 691.6; 715/752; 379/157, 209.01, 286, 350, 77
See application file for complete search history.

(56) References Cited

U.S. PATENT DOCUMENTS

| 7,552,185 | B1 | 6/2009 | Kirzner et al. |
| 7,774,421 | B2 | 8/2010 | Dubovsky et al. |
| 8,037,143 | B1* | 10/2011 | Atkins et al. ................. 709/206 |
| 2005/0135681 | A1* | 6/2005 | Schirmer ...................... 382/229 |
| 2007/0106741 | A1* | 5/2007 | Christoff ............. G06Q 10/107 709/206 |
| 2007/0294428 | A1* | 12/2007 | Guy ..................... G06Q 10/107 709/245 |
| 2008/0250114 | A1* | 10/2008 | Dubovsky et al. ........... 709/206 |
| 2009/0037542 | A1* | 2/2009 | Chen .................... G06Q 10/107 709/206 |

(Continued)

FOREIGN PATENT DOCUMENTS

EP    1755294 A1    2/2007

OTHER PUBLICATIONS

IBM, "Identifying mailing list conflicts while replying emails", IP.com No. IPCOM000193452D, Feb. 25, 2010.

(Continued)

*Primary Examiner* — Melvin H Pollack
(74) *Attorney, Agent, or Firm* — Schmeiser, Olsen & Watts LLP

(57) ABSTRACT

Systems and methods of confirming an addressee of an email message include receiving an email message addressed to one or more forwarding addresses. At least one email address associated with each of the one or more forwarding addresses is obtained. A potential discrepancy in the email message is detected in response to the at least one obtained email address. Before sending the email message, an alert is issued to a sender of the email message. The alert provides a recommendation regarding whether to continue with sending the email message and identifies content associated with the email message that led to detecting the potential discrepancy.

19 Claims, 3 Drawing Sheets

(56) References Cited

U.S. PATENT DOCUMENTS

2011/0099239 A1* 4/2011 Buchheit .............. G06Q 10/107
709/206

OTHER PUBLICATIONS

IBM, "Catching mistaken choice of Sender or Recipient accounts in electronic mail", IP.com No. IPCOM000180197D, Mar. 5, 2009.
IBM, "Email group usage that excludes listed addresses", IP.com No. IPCOM000142426D, Oct. 27, 2006.
IBM, "Method and apparatus for email address resolving and post-validation based on context", IP.com No. IPCOM000177934D, Jan. 12, 2009.

* cited by examiner

ELECTRONIC MAIL MESSAGING SYSTEM AND METHOD

FIELD OF THE INVENTION

The invention relates generally to electronic mail messaging systems.

BACKGROUND

Some electronic mail messaging systems allow users to create aliases or groups. When an email is addressed and sent to an alias or to a mailing list, all users who are members of the alias or mailing list receive the email. Aliases and mailing lists (referred to generally as forwarding addresses) prove helpful because they assist users with sending an email to a number of people without having to remember long email addresses or the names of everyone in that mailing list. In addition, when a mailing list is large, an email user needs only enter a single name into the 'To:' field of the email message, rather than enter a long list of names, which takes time, care, and may introduce typing errors. An alias or mailing list can be defined locally, that is, the alias or mailing list applies only to the email user who generated it, or globally, that is, to a larger audience of email users who have access to the alias or mailing list.

SUMMARY

In one aspect, the invention features a method of confirming an addressee of an email message. An email message addressed to one or more forwarding addresses is received. At least one email address associated with each of the one or more forwarding addresses is obtained. A potential discrepancy in the email message is detected in response to the at least one obtained email address. Before sending the email message, an alert is issued to a sender of the email message. The alert provides a recommendation regarding whether to continue with sending the email message and identifies content associated with the email message that led to detecting the potential discrepancy.

In another aspect, the invention features a collaborative messaging system comprising a server computing system having a processor running an email server and analytics program code. The email server receives an email message addressed to one or more forwarding addresses and obtains at least one email address associated with each of the one or more forwarding addresses. The analytics program code detects a potential discrepancy in the email message in response to the at least one email address. The email server issues an alert to a sender of the email message before sending the email message. The alert provides a recommendation regarding whether to continue with sending the email message and identifies content associated with the email message that led to detecting the potential discrepancy.

In another aspect, the invention features a computer program product for confirming an addressee of an email message. The computer program product comprises a computer readable storage medium having computer readable program code embodied therewith. The computer readable program code comprises: computer readable program code configured to receive an email message addressed to one or more forwarding addresses; computer readable program code configured to obtain at least one email address associated with each of the one or more forwarding addresses; computer readable program code configured to detect a potential discrepancy in the email message in response to the at least one email address; and computer readable program code configured to issue an alert to a sender of the email message before sending the email message. The alert provides a recommendation regarding whether to continue with sending the email message and identifying content associated with the email message that led to detecting the potential discrepancy.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Applicants recognized a source of a potential information leak when an email recipient replies to an email message addressed to an alias or to a group (also referred to as a mailing list or a distribution list). A common response to receiving an email message addressed to multiple recipients, such as to an alias or to a group, is for the user to send the "reply to all." After the user starts to prepare the reply, the name of the group or alias automatically appears as an addressee. This automatic addressing occurs without any validation of the group or alias in the "To:" or "cc" addressee fields; that is, there is no determination whether the group or alias in such fields is actually the same as the group or alias to which the first email was initially sent. Consequently, the wrong individuals might receive the reply. Further, confidential information might be sent to the wrong individuals simply because an auto-completion feature of the email system picked the first matching cached string to add to the "To:" or "cc:" addressee fields in the email.

Collaborative messaging systems described herein include safeguards that ensure email messages are sent to the proper individuals when the user addresses an email to a group list or to an email alias or uses email auto-completion to fill in an email address. The safeguards entail comparisons between local mailing lists and global mailing lists and detailed alerts that inform the user about the choice being made when memberships of the compared lists do not match. An alert can require the user to choose between two groups or to confirm the current group selection. Sufficient information accompanies the alert to enable the user to make an informed decision. Other safeguards look for inconsistencies between the addressees of an email message and email content or between memberships of multiple group lists presented in an email.

Figure 1:
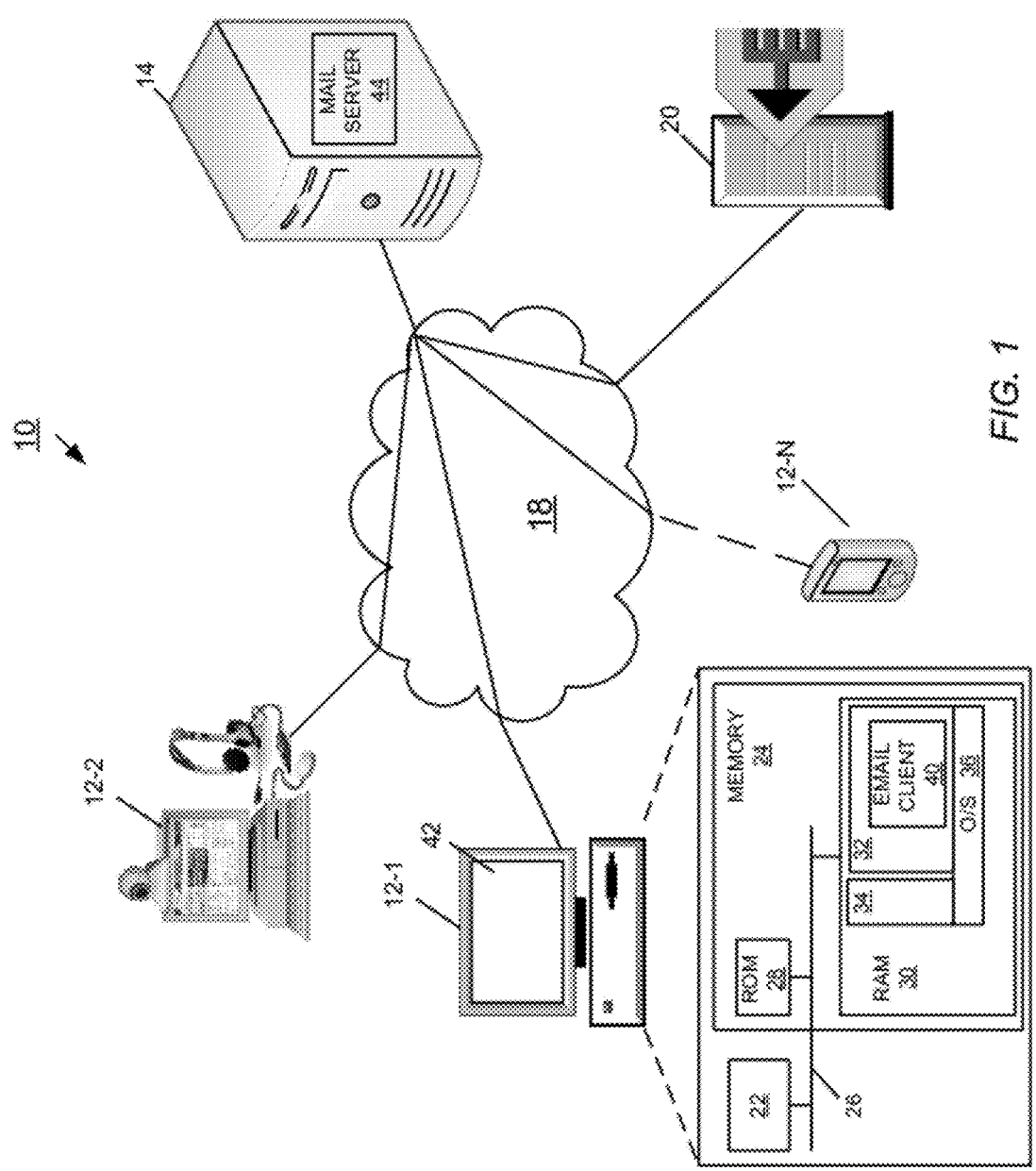
FIG. 1 is a block diagram of an embodiment of a collaborative messaging system having a plurality of client devices in communication with a server computing system over a network.

FIG. 1 shows an example of a collaborative messaging system 10 including a plurality of client electronic devices 12-1, 12-2, 12-N (generally, clients 12) in communication with a server computing system 14 over a network 18. Exemplary implementations of the clients 12 include, but are not limited to, personal computers (PC), Macintosh computers, workstations, laptop computers, kiosks, handheld devices, such as a personal digital assistant (PDA), cellular phones, smartphones, Apple iPads™, Amazon KINDLEs®, navigation and global positioning systems, and network terminals. Also connected to the network 18 is an information server system 20.

The client 12-1 includes a processor 22 in communication with memory 24 over a communication bus 26. Client 12-1 is generally representative of the various clients 12 connected to the network, although some of the clients, depending on the type of device, may lack some of the components or have additional or different components from those described in connection with client 12-1. The memory 24 includes non-volatile computer storage media, such as read-only memory (ROM) 28, and volatile computer storage media, such as random-access memory (RAM) 30. Typically stored in the ROM 28 is a basic input/output system (BIOS), which contains program code for controlling basic operations of the client 12-1 including start-up of the computing device and initialization of hardware. Stored within the RAM 30 are program code and data. Program code includes, but is not limited to, application programs 32, program modules 34 (e.g., browser plug-ins), and an operating system 36 (e.g., Windows 95, Windows 98, Windows NT 4.0, Windows XP, Windows 2000, Vista, Windows 7, Linux, and Macintosh, Windows Mobile™, Mobile Linux™, Symbian OS™, Palm OS™, Mobile OS™, and Android™). One such application program 32 is an email client program 40. The email client program 40 can be any proprietary email client program or any commercially available email client program, for example, Lotus NOTES™, Google Mail, Yahoo email, and Microsoft OUTLOOK™. Other application programs 32 can include, but are not limited to, browsers, instant messaging programs, and office applications, such as spreadsheet, word processor, and slide presentation software.

Typically, the communication bus 26 connects the processor 22 to various other components of the client 12-1 including, for example, a user-input interface, a memory interface, a peripheral interface, a video interface, a local network interface, and a wide-area network interface (not shown). A display screen 42 connects to the communication bus 26 through the video interface. Exemplary implementations of the communication bus include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus. Over a wire or wireless link, the user-input interface is in communication with one or more user-input devices, e.g., a keyboard, a mouse, trackball, touch-pad, touch-screen, microphone, joystick, by which a user can enter information and commands into the client 12-1.

Embodiments of the network 18 include, but are not limited to, local-area networks (LAN), metro-area networks (MAN), and wide-area networks (WAN), such as the Internet or World Wide Web. Each client 12 can connect to the server system 14 over the network 18 through one of a variety of connections, such as standard telephone lines, digital subscriber line (DSL), asynchronous DSL, LAN or WAN links (e.g., T1, T3), broadband connections (Frame Relay, ATM), satellite, and wireless connections (e.g., 802.11(a), 802.11(b), 802.11(g)). The server computing system 14 includes an email server program 44 for transferring electronic mail messages from sender clients to recipient clients.

The information server 20 generally provides information-gathering services. In one embodiment, the information server 20 includes a LDAP server that provides a directory service for accessing membership information stored in LDAP repositories. In other embodiments, the information server 20 has access to various other types of information in, for example, LDAP-like databases, relational databases, proprietary databases. The server 20 can also have access to external systems that store hierarchical data. Examples of such external systems include, but are not limited to, a custom user registry, flat files, or any other repository.

Figure 2:
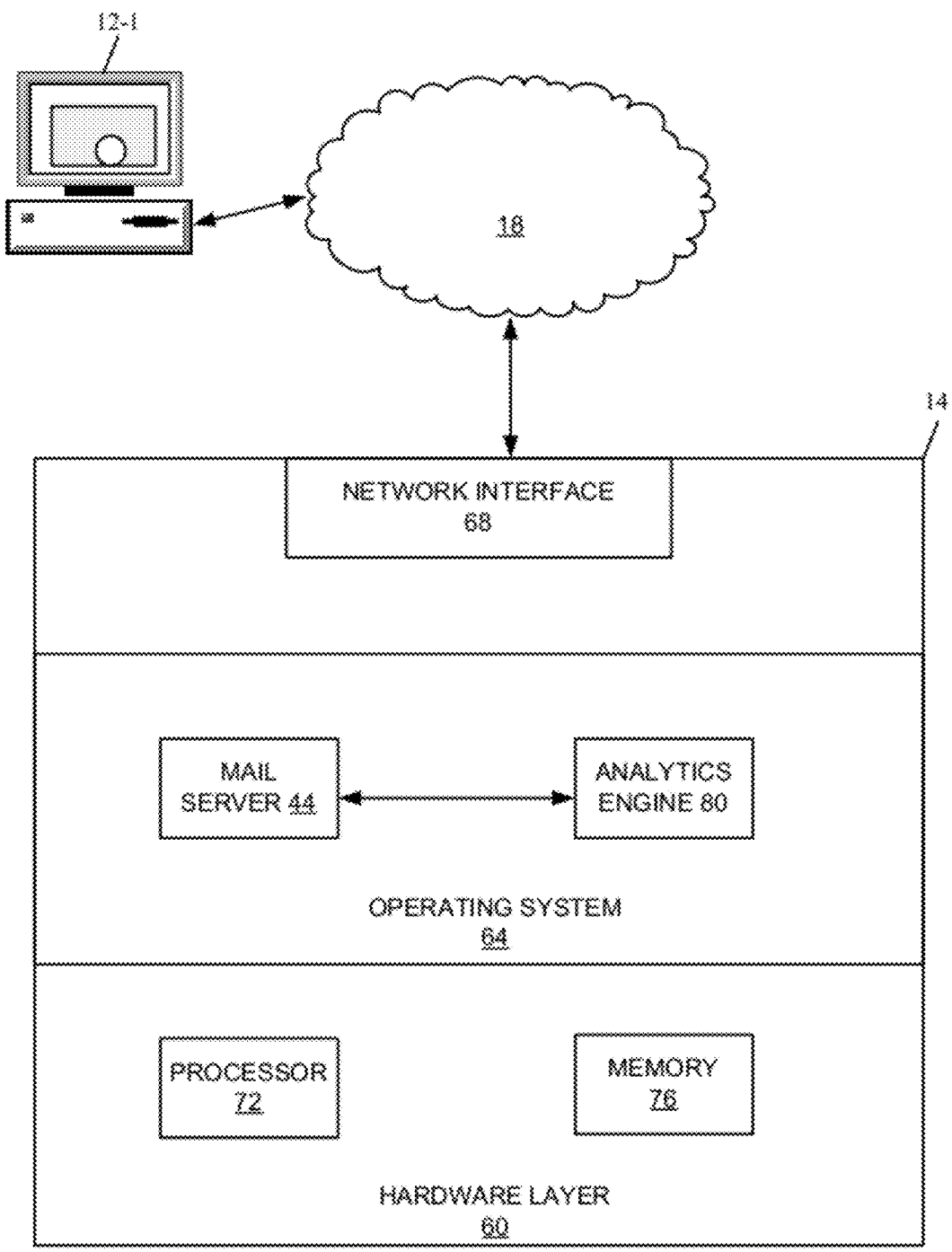
FIG. 2 is a block diagram representation of an embodiment of the server computing system.

FIG. 2 shows an embodiment of the server computing system 14 including a hardware layer 60 and an operating system 64. A network interface 68 connects the server computing system 14 to the network 18. The hardware layer 60 includes a processor 72 and memory 76. Running on the operating system 64 is the mail server 44 (FIG. 1) in communication with an analytics engine 80. The analytics engine 80 can be incorporated as part of the mail server 44.

In brief overview, the analytics engine 80 examines each email, analyzing the email for potential discrepancies among the addressees listed in the 'To:', 'cc:', and 'bcc:' addressee fields. Before an email can be sent, the analytics engine 80 parses the 'To:', 'cc:', and 'bcc:' addressee fields, the subject line, attachments, and the textual content in the email body.

As part of its analysis, the analytics engine 80 looks for whether an addressee corresponds to an alias or a group list. Group lists can be local or global. A local group list is personal to a particular user, being generated by that user, containing email addresses of members chosen by that user, having a local group name given by that user, and being accessible to that user only. Global groups can be generated by any user, contain email addresses of members chosen by its authoring user, be given a name by that user, and be accessible generally to any user or to a particular set of users of the collaborative messaging system. When resolving group names to email addresses, local group lists have precedence over global group lists. The same precedence holds for local aliases over global aliases. As used herein, a forwarding address preferably encompasses alias addresses and group lists.

Several different email-addressing situations pose potential discrepancies to be watched for by the analytics engine 80. In each of these situations, the sender of the initial email is using a mailing list (either local or global). When the replier starts to prepare a reply to the initial email, the mailing list automatically appears as an addressee. If either a local group list of the replier or a global group list accessible to the replier is used to resolve the addresses of the mailing list, the analytics engine 80 operates to validate use of that group list before the email can be sent.

In one situation, the sender uses a local group list when sending an initial email and the replier has a local group list with the same group name when sending a reply email. Despite having the same group names, the membership of the two local group lists are different from each other. As a consequence, the replier would be sending a reply email to a different group of people from the group who received the initial email. To prevent such a possibility, the collaborative messaging system brings the membership of the replier's local group list to the replier's attention and requires confirmation before the reply email can be sent, as described in more detail below.

As another situation, the sender uses a local group list when sending an initial email and the replier does not have a local group list with the same name as the sender's group list. However, the mail server has a global group list with the same group name but different group membership from that of the sender's local group list. As a consequence, the mail server 44 resolves the group name in the reply email to the addressees in the global group list. The replier would again be sending a reply email to a different group of people from the group who received the initial email. To prevent this possibility, the collaborative messaging system brings the membership of the global group list to the replier's attention and requires confirmation before the reply email can be sent, as described in more detail below.

As yet another situation, the sender uses a global group list when sending an initial email. The replier has a local group list with the same name but different group membership as the sender's group list, and the mail server has a global group list with the same name and the same group membership as the sender's group list. Because the replier's local group list has precedence over the mail server's global group list during email address resolution, the replier would be sending a reply email to a different group of people from the group who received the sender's initial email. To prevent this possibility, the analytics engine 80 compares the membership of the replier's local group list with the membership of the mail server's global group list, and, finding a discrepancy, induces the mail server to send the replier an alert showing the memberships of both group lists, and requiring a group selection and confirmation before the reply email can be sent, as described in more detail below.

As still another situation, the sender uses a local group list when sending an initial email, but neither the replier nor the mail server has a local group list or a global group list, respectively, with the same name as the sender's local group list. Consequently, the group name in the reply email cannot be resolved to any email addresses. In this event, the collaborative messaging system sends an alert to the replier specifying the inability to find an addressee and providing details of the cause of the discrepancy, such as, for example, 'No such local or global group name as . . . ' or "No such alias as . . . ". In addition, the collaborative messaging system provides a suggestion or recommendation for correcting the discrepancy.

As yet another situation, the sender uses a global group list when sending an initial email but the replier does not have access to that global group list. In addition, the replier does not have a local group list with the same name. In this instance, the group name in the reply email cannot be resolved to any email addresses (there being no local group list or accessible global group list accessible to the replier). In this event, the collaborative messaging system sends an alert to the replier specifying the inability to find an addressee and providing details of the cause of the discrepancy. The alert may further mention that a global group list exists by the same name used by the replier, but that the replier's email account is not currently configured to use it. Again, the collaborative messaging system can provide a suggestion or recommendation for correcting the discrepancy.

As examples of other analysis that may be performed to look for discrepancies associated with the use of aliases and group lists, the analytics engine 80 can also compare the content of an email with past emails or threads that have been communicated previously to the group or alias addressed in the email. If the content of the email appears to be a novel topic (a topic hitherto not discussed between the sender and the alias or a threshold number of the group members), the analytics engine 80 can consider this to be a discrepancy to be brought to the sender's attention.

The analytics engine 80 can also evaluate whether the content of the email is consistent with the designated group or alias. For example, consider that one group list in the email includes email addresses of employees of Company A, and the analytics engine 80 finds in the body of the email the words "IBM Confidential." Because, in this example, company A may not be privy to IBM confidential information, the analytics engine 80 can consider this to be a discrepancy to be brought to the sender's attention.

The analytics engine 80 can compare group membership between multiple group lists presented as addressees in an email and evaluate whether the addressing of different groups in the same email poses a discrepancy. For example, consider that the email includes a first group list corresponding to email addresses of corporate executives and a second group list corresponding to entry-level employees. For the purposes of such types of determinations, the analytics engine 80 is in communication with an LDAP server to query, in real time, into a LDAP hierarchical system and to find therefrom relationships among the members of the different groups. The analytics engine 80 can be configured to consider the disparity among members in the different groups as a discrepancy to be brought to the sender's attention.

The aforementioned situations analyzed by the analytics engine 80 are intended as examples; the analytics engine 80 can detect other types of situations posing potential discrepancies from those described.

In response to encountering any of the above situations, the analytics engine 80 induces the email server 44 to produce an alert that describes the detected discrepancy. The alert can highlight the portion of the email's content that provoked the discrepancy and specifically explain the rationale behind the alert. For example, the alert can state, "The subject line says IBM confidential, but the addressees include an executive group at another company," or, "This email is addressed to executives of the corporation and to entry-level employees. One or both group lists may be incorrect." The alert can include a recommendation regarding whether or not the email should be sent based on the nature, number, and perceived severity of any discrepancies detected. When the instance warrants, a recommendation can include a positive notice of there being no discrepancies found.

As another example, the alert can include a list of the members of the group and their email addresses (as currently presented in the email) and request confirmation before sending the email. If there are multiple groups with the same name (i.e., a local group and a global group), the analytics engine 80 can list the members of each group and require the replier to select one of the two groups.

In addition, the analytics engine 80 can provide a recommendation as to which group to use and evaluate the sender's selection. If the analytics engine 80 concludes the user has made an incorrect choice, a subsequent alert explains to the sender why the selection is thought to be an error, and asks the sender to confirm the choice again. For example, the sender may choose the group list that includes the entry-level employees over the executive group list, but the analytics engine 80 determines that one email attachment pertains to an annual report to be presented to stockholders of the corporation. In this instance, the analytics engine 80 may conclude that the sender's selection is inconsistent with the content of the email.

Figure 3:
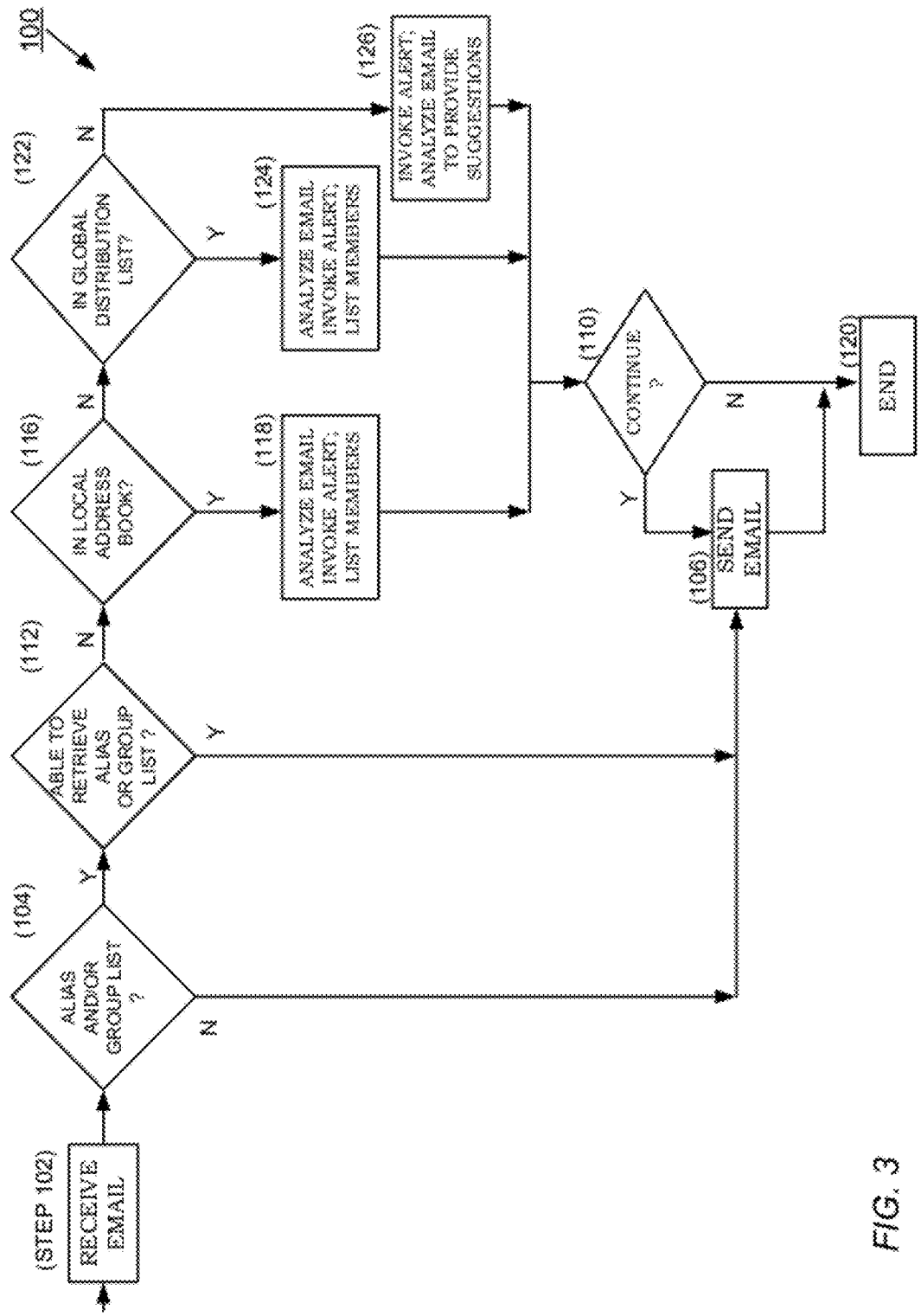
FIG. 3 is a flow diagram of an embodiment of a process for confirming an addressee of an email.

FIG. 3 shows an embodiment of a process 100 for confirming addressees of an email message before the email message may be sent. In one embodiment, the email message is a reply email written by a user who is replying to earlier email that the user received. In other embodiments, the email message is a forwarding email or an initial email. Typically, for reply emails, the collaborative messaging system automatically fills the 'To:' addressee field with the email address of the sender of the initial email. In addition, if the email recipient chose to reply to all, the email system also automatically fills the "cc:" addressee field with the other addressees of the initial email. For initial and forwarding emails, the user typically types in the addressees into the 'To:' and, optionally, into the 'cc:' and 'bcc:' fields. Conceivably, the user may enter an erroneous alias or group name. For example, an auto-completion feature of the email system may supply the erroneous alias or group name, which the user unwittingly selects. Or the user may simply enter an alias or group name erroneously believing it to be correct. In each of the embodiments, after entering the addresses, the sender sends the email. The email server 44 of the server computing system 14 receives (step 102) the email.

Before sending the email on to its addressees, the collaborative messaging system determines (step 104) whether any of the address fields contains an alias or a group list. If there are no aliases or group lists in the email, the collaborative messaging system sends (step 106) the email to the email addresses in the address fields.

If an alias or group list is found, the email system determines (step 112) whether that alias or group list is available. For example, some collaborative messaging systems maintain a cache of aliases and group lists of previously delivered email messages. If the collaborative messaging system is able to retrieve the alias or group list from cache, the corresponding email addresses are resolved based on the list retrieved from cache, and the collaborative messaging system sends (step 106) the email to the resolved email addresses.

If, instead, the collaborative messaging system cannot retrieve the alias or group list from cache, the collaborative messaging system attempts (step 116) to find the alias or group list in the local address book of the user who is sending the email. If found, the collaborative messaging system analyzes the email, looking for discrepancies, including whether a global list by the same name exists at the mail server. The collaborative messaging system invokes (step 118) an alert that can include the email address of the alias or the member(s) in the found local group list. Even if no discrepancies are found, the analytics engine 80 can include this finding of no discrepancies in the alert. Additionally, the collaborative messaging system can ask the user to confirm (step 110) whether to send the email. Upon confirmation, the email is sent (step 106) or ended (step 120) without sending.

The alert and confirmation process can take on additional complexity if a global list is found by the same name as the local list. In this event, the collaborative messaging system can list the membership of both groups in the alert and request that the user make a choice. As previously described, the alert can contain a recommendation as to which group to choose, and the collaborative messaging system can challenge the user with yet another alert if the email system concludes that the wrong choice was made. This heightened level of challenge and confirmation should improve the quality of the sender's choice, whether to confirm, correct and confirm, or simply end the email process.

If, instead, the alias or group list is not found in the local address book, the collaborative messaging system attempts (step 122) to find the alias or group list in a global distribution list at the mail server. If found, the collaborative messaging system analyzes (step 124) and invokes an alert that can include the email address of the aliases or of the member(s) in the found global distribution list. If, instead, the alias or group list is not found in the global distribution list, the email system invokes (step 126) another type of alert indicating failure to find the addressee and providing guidance regarding the possible cause for problem. The collaborative messaging system also analyzes the email in order to present a suggestion or recommendation for correcting the problem. Additionally, the collaborative messaging system asks the user to confirm (step 110) whether to send the email (presumably, after the appropriate correction has been made).

Although primarily described herein in the context of reply emails, some of the principles of looking for discrepancies among addressees apply also to initial emails and forwarded email. For example, looking for disparities between group memberships of those group names in the email; checking for novel subject matter with respect to specific addresses; and checking for inconsistencies between group members and the email content, are examples of concepts that are not limited to reply emails, but apply to initial email and forwarding emails.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of confirming an addressee of an email message, the method comprising:
   receiving an email message addressed to one or more forwarding addresses that include a local mailing list;
   identifying a global mailing list with a duplicate name as a name of the local mailing list;
   considering the identification of the global mailing list with the duplicate name as the name of the local mailing list to be a potential discrepancy in the email message and detecting the potential discrepancy by determining that content of the email message is inappropriate for one or more members of the local mailing list; and
   issuing, before sending the email message, an alert to a sender of the email message in response to the potential discrepancy in the email message, the alert providing a recommendation regarding whether to continue with sending the email message.

2. The method of claim 1, further comprising displaying in the alert each member of the local mailing list to the sender of the email message.

3. The method of claim 1, further comprising requesting in the alert that the sender of the email message select between the local mailing list and the global mailing list.

4. The method of claim 3, further comprising providing a recommendation in the alert as to which of the mailing lists to choose.

5. The method of claim 4, further comprising issuing a second alert upon concluding the sender of the email message has selected a wrong mailing list of the two mailing lists.

6. The method of claim 1, wherein the one or more forwarding addresses includes multiple mailing lists, and wherein detecting the potential discrepancy in the email message includes comparing membership of one of the multiple mailing lists with membership of another of the multiple mailing lists; and finding, in response to the comparison, that sending the email message to the multiple mailing lists presents an inconsistency.

7. The method of claim 1, further comprising:
   obtaining at least one email address associated with each of the one or more forwarding addresses; and
   analyzing one or more past email messages between the sender and the at least one email address; and wherein detecting the potential discrepancy in the email message includes determining that content of the email message presents a novel topic of communication between the sender and the at least one email address.

8. A collaborative messaging system comprising:
   a server computing system having a processor running an email server and analytics program code, the email server receiving an email message addressed to one or more forwarding addresses that include a local mailing list, the analytics program code identifying a global mailing list with a duplicate name as a name of the local mailing list and considering the identification of the global mailing list with the duplicate name as the name of the local mailing list to be a potential discrepancy in the email message and detecting the potential discrepancy by the analytics program code determining that content of the email message is inappropriate for one or more members of the local mailing list, the email server issuing, in response to the potential discrepancy, an alert to a sender of the email message before sending the email message, the alert providing a recommendation regarding whether to continue with sending the email message.

9. The collaborative messaging system of claim 8, wherein the alert includes each member of the local mailing list to the sender of the email message.

10. The collaborative messaging system of claim 8, wherein the alert requests that the sender of the email message select between the local mailing list and the global mailing list.

11. The collaborative messaging system of claim 10, wherein the alert provides recommendation as to which of the mailing lists to choose.

12. The collaborative messaging system of claim 8, wherein the one or more forwarding addresses includes multiple mailing lists, and wherein the potential discrepancy is detected by the analytics program code comparing membership of one of the multiple mailing lists with membership of another of the multiple mailing lists, and finding, in response to the comparison, that sending the email message to members of the multiple mailing lists presents an inconsistency.

13. The collaborative messaging system of claim 8, wherein the analytics program code obtains at least one email address associated with each of the one or more forwarding addresses, analyzes one or more past email messages between the sender and the at least one email address, and detects the potential discrepancy in the email message by determining that content of the email message presents a novel topic of communication between the sender and the at least one email address.

14. A computer program product for confirming an addressee of an email message, the computer program product comprising:
  a computer readable non-transitory storage medium having computer readable program code embodied therewith, the computer readable program code comprising:
  computer readable program code configured to receive an email message addressed to one or more forwarding addresses that include a local mailing list;
  computer readable program code configured to identify a global mailing list with a duplicate name as a name of the local mailing list and to consider the identification of the global mailing list with the duplicate name as the local mailing list to be a potential discrepancy in the email message, and to detect that the potential discrepancy in the email message includes computer-readable program code configured to determine that content of the email message is inappropriate for one or more members of the local mailing list; and
  computer readable program code configured to issue, in response to the potential discrepancy, an alert to a sender of the email message before sending the email message, the alert providing a recommendation regarding whether to continue with sending the email message and identifying the global mailing list with the duplicate name as the local mailing list.

15. The computer program product of claim 14, further comprising computer readable program code configured to display in the alert each member of the local mailing list to the sender of the email message.

16. The computer program product of claim 14, further comprising computer-readable program code configured to request in the alert that the sender of the email message select between the local mailing list and the global mailing list.

17. The computer program product of claim 16, further comprising computer-readable program code configured to provide a recommendation in the alert as to which of the mailing lists to choose.

18. The computer program product of claim 14, wherein the one or more forwarding addresses includes multiple mailing lists, and wherein the computer-readable program code configured to detect the potential discrepancy in the email message includes: computer-readable program code configured to compare membership of one of the multiple mailing lists with membership of another of the multiple mailing lists; and computer-readable program code configured to find, in response to the comparison, that sending the email message to the multiple mailing lists presents an inconsistency.

19. The computer program product of claim 14, further comprising:
  computer readable program code configured to obtain at least one email address associated with each of the one or more forwarding addresses; and
  computer-readable program code configured to analyze one or more past email messages between the sender and the at least one email address; and wherein the computer-readable program code configured to detect the potential discrepancy in the email message includes computer-readable program code configured to determine that content of the email message presents a novel topic of communication between the sender and the at least one email address.

* * * * *